UNITED STATES PATENT OFFICE.

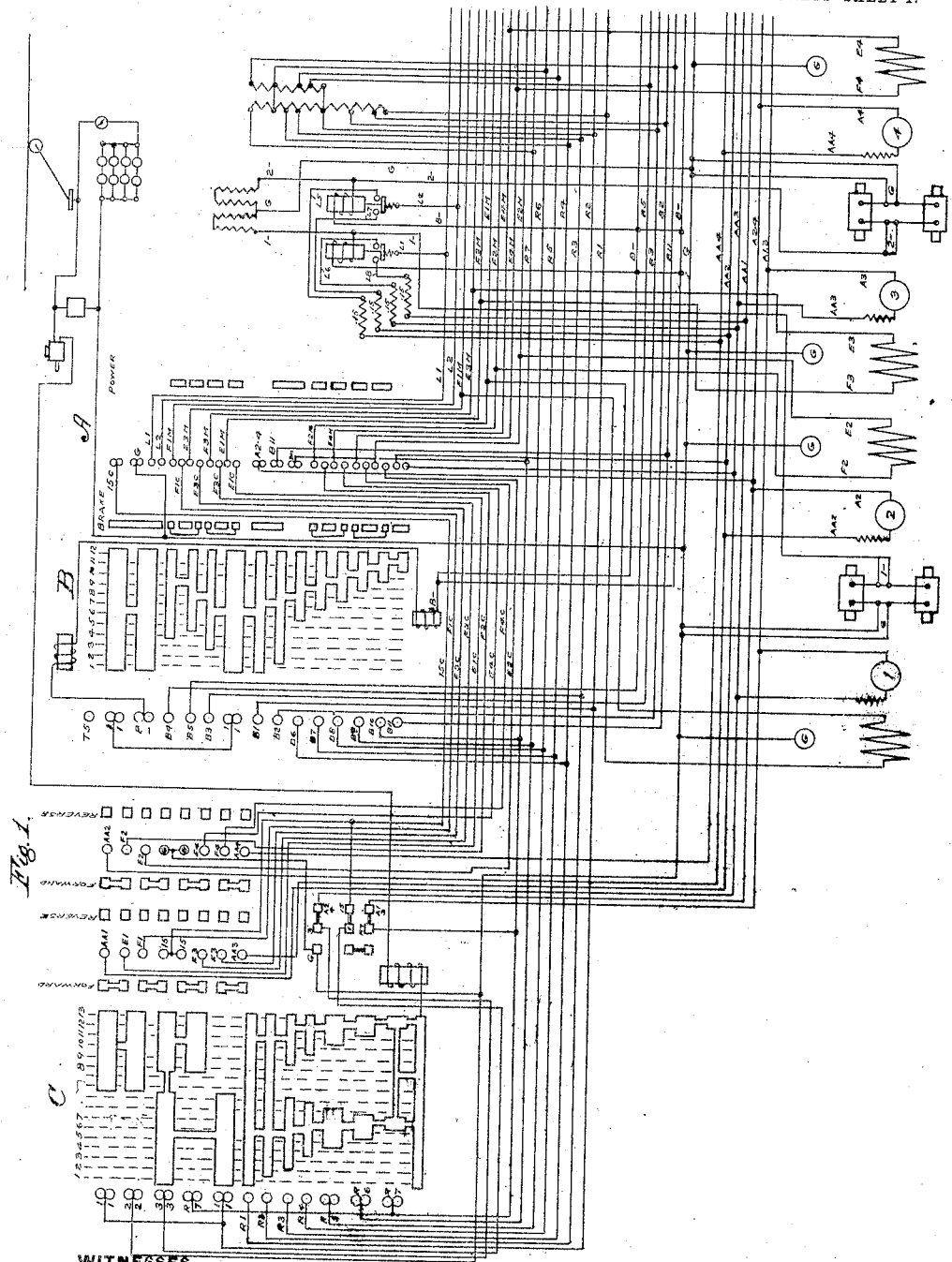

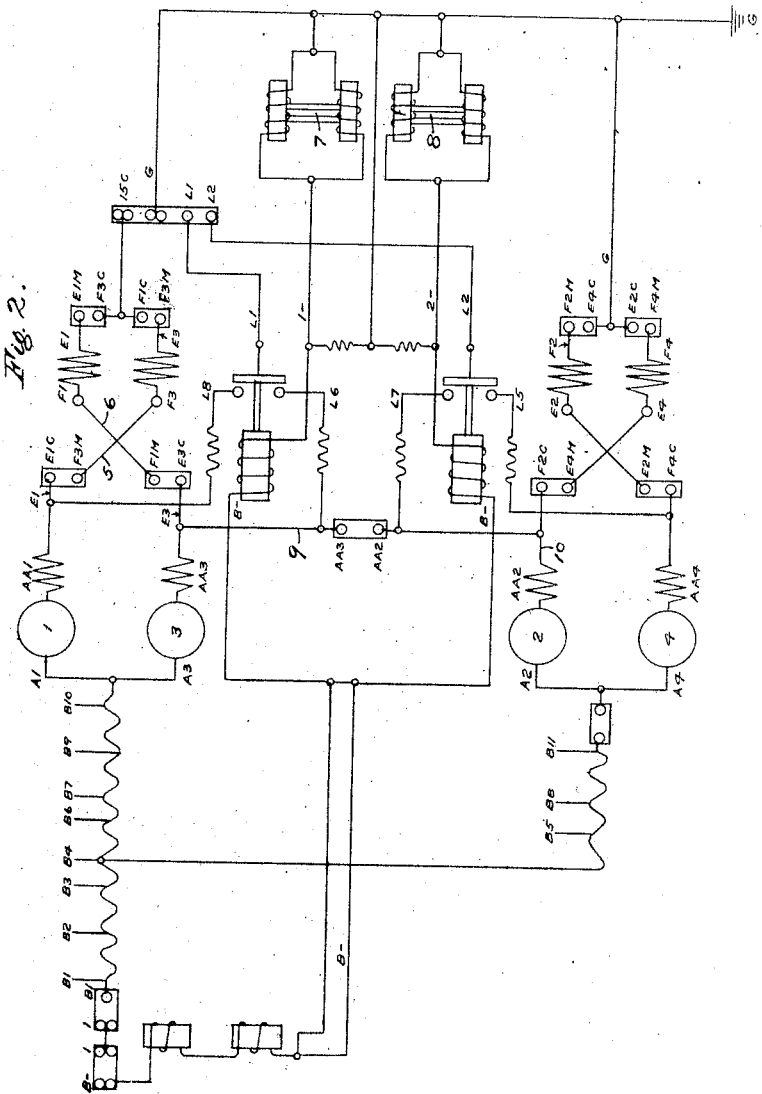

JOSEPH N. MAHONEY, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

ELECTROMAGNETIC BRAKE.

985,819.      Specification of Letters Patent.      Patented Mar. 7, 1911.

Application filed July 29, 1909. Serial No. 510,191.

*To all whom it may concern:*

Be it known that I, JOSEPH N. MAHONEY, a citizen of the United States, residing at Wilkinsburg, in the county of Allegheny and State of Pennsylvania, have invented new and useful Improvements in Electromagnetic Brakes, of which the following is a specification.

This invention relates to means for braking electric motor driven vehicles, and more particularly to a system in which the motors are connected up to act as generators, the generative action itself constituting a brake and in some cases the current generated is also supplied to a local brake circuit containing electric brake devices.

It has heretofore been proposed to employ motors with auxiliary poles or interpole field coils for the purpose of generating in the armature coils a compensating electro-motive force as each armature coil is undergoing commutation, so that commutation is effected without excessive or destructive sparking even where heavy currents are being generated.

Where a plurality of electric motors are employed for braking it is usual to connect up the motors in multiple groups or units, each unit consisting of two or more motors. With such an arrangement, it has been found that as no two motors can be made in practice to generate exactly equal electromotive forces, the stronger machine will overcome the electro-motive force of the weaker machine and reversing the current flow therein, will operate the weaker machine as a motor, thus interfering with the braking functions of the apparatus. It has been proposed to obviate this difficulty as to the ordinary types of motors by either providing what is termed an equalizing connection across the connections between the fields and the armatures, or by cross connecting the field of one motor with the armature of the other, so that the generative action of each motor is equalized. In the case of interpole motors, however, an equalizing connection across the armature leads will not be effective for the desired purpose, because the machines may still act as generators in a circuit formed through the equalizing connection, the interpole field coils, and the motor armatures. This action is particularly undesirable in the case of interpole motors, on account of the excessive sparking liable to be produced under such conditions at the commutator.

The principal object of my invention contemplates the cross connection of the main field of one motor with the armature of another motor in each group or unit and the provision of an equalizing connection adapted to connect a main motor field of one unit or group with a main motor field of another unit. By this means each unit is compelled to generate in the same direction while one unit is prevented from overcoming another unit by reason of the equalizing connection.

In the accompanying drawings; Figure 1 is a diagrammatic view of an interpole motor equipment, showing the motor controllers developed and the controlling circuits and embodying my improvement and Fig. 2 a diagrammatic view of the circuits as formed in the first braking position.

To illustrate an application of my improvement the drawings show a four interpole motor equipment the circuit connections of which are governed by a running controller C and a braking controller B. The running controller C may be operated in the usual manner to govern the movement of the car and if it is desired to apply the brakes, the running controller is thrown to off position and the braking controller B is moved to its first braking position, the brake switch A being also shifted to the position marked "brake." The circuits formed in this position will then be as shown in Fig. 2 of the drawings and may be traced as follows; starting at point $A^1$ the circuit is through armature 1, interpole field coil $AA^1$, $E^1$, points $E^1C$ and $F^3M$ and cross connection 5 to point $F^3$, thence through field coil of motor No. 3, connection $E^3$, and points $E^3M$ and $F^1C$. Similarly starting at point $A^3$, the circuit is through armature 3 interpole field coil $AA^3$, connection $E^3$, points $E^3C$ and $F^1M$, cross connection 6 to point $F^1$ and thence through the main field coil of motor No. 1 to points $E^1M$ and $F^3C$. Points $A^1$ and $A^3$ and points $F^3C$ and $F^1C$ being respectively connected, a unit or group of two motors, having the field of one motor cross connected with the armature of the other motor is formed. In like manner motors No. 2 and No. 4 are connected up to form a unit or group of motors, as may be readily traced.

A local brake circuit is formed by means of connecting wire G which joins points in the circuits of the two motor units, and wire B, which connects the armature leads $A^1$, $A^3$, $A^2$, and $A^4$ through the respective local resistances $B^4$ to $B^{10}$ inclusive and $B^5$ to $B^{11}$ inclusive and the common resistance $B^1$ to $B^4$. Connected in parallel in the local brake circuit between the circuit wires G and B are brake magnet devices 7 and 8. It will now be evident that the movement of the vehicle will operate the motors as generators to supply current to the local brake circuit and thus effect the braking of the car.

In carrying out my invention the field coil of one motor of one group or unit is connected to a field coil of one motor of the other group and accordingly from the connecting wire $E^3$ an equalizing wire 9 leads to connecting wire 10, so that the field coil of motor No. 1 is connected with field coil of motor No. 4. It will now be seen that the output of each individual motor is equalized by means of the cross connection whereby the armature of one motor feeds the field of the other motor of the unit, so that "bucking" within the unit is prevented, while any tendency of one of the units to generate a higher electro-motive force than the other unit is checked by means of the equalizing connection 9.

It will be understood that although a specific construction is shown in the drawings, in order to illustrate an application of my invention, I do not mean to limit the invention, as it is evident that the same may be employed in other ways, for instance the brake devices 7 and 8 may not be employed, in some cases, and the circuits may be so connected as to return the current to the line, the generative action only of the motors being employed to effect the braking action.

Having now described my invention, what I claim as new and desire to secure by Letters Patent, is:—

1. In an electric braking apparatus, the combination with a plurality of motors connected up in groups to act as generators, of a connection from a field of one of the motors of one group to the field of a motor of another group.

2. In combination with a plurality of motors adapted to be connected up in groups to act as generators for braking purposes, of an equalizing connection from a motor field in one group to a motor field in another group.

3. In an electric braking apparatus, the combination with a plurality of motors connected up to form a series of two or more units and adapted to act as generators for braking purposes, each unit having the armature of one motor cross connected to the field of another motor, of an equalizing connection adapted to connect a field of one of the motors in one unit with a field of one of the motors in another unit.

4. In an electric braking apparatus, the combination with a plurality of electric motors of the type having main and auxiliary fields, of means for connecting up the motors in groups to act as generators for braking, a main field of one motor in a group being cross connected to an armature of another motor of said group and an equalizing connection adapted to connect a main motor field of one motor of a group with a main motor field of a motor of another group.

5. In an electric braking apparatus, the combination with interpole motors adapted to be connected up in generative units of two motors having the main field of one motor cross connected to the armature of the other motor for supplying current to a local brake circuit, of an equalizing connection from the main field of a motor in one unit to the main field of a motor in another unit.

6. The method of operating a plurality of motors as generators to supply current for braking purposes which consists in connecting up the motors in groups with the field of one motor in each group connected to the armature of another motor in the group and in connecting the field of a motor in one group with the field of a motor in another group.

In testimony whereof I have hereunto set my hand.

JOSEPH N. MAHONEY.

Witnesses:
WM. M. CADY,
A. M. CLEMENTS.